United States Patent [19]
Chen et al.

[11] Patent Number: 5,568,857
[45] Date of Patent: Oct. 29, 1996

[54] LIFTABLE ROLLER CONVEYER

[75] Inventors: Kuan-Chou Chen, Hsin Ying; Duen-Jyh Shyr, Chutung, both of Taiwan

[73] Assignee: Industrial Technology Research Institute, Hsinchu Hsien, Taiwan

[21] Appl. No.: 488,798

[22] Filed: Jul. 31, 1995

[51] Int. Cl.$^6$ ................................................ B65G 21/10
[52] U.S. Cl. ........................ 198/592; 198/581; 198/861.5
[58] Field of Search ............................. 198/581, 589, 198/592, 632, 861.5, 781.04

[56] References Cited

U.S. PATENT DOCUMENTS

| | | | |
|---|---|---|---|
| 1,338,727 | 5/1920 | Gretencord | 198/589 |
| 2,675,118 | 4/1954 | Morrison | 198/592 X |
| 2,696,900 | 12/1954 | Finstead | 198/592 |
| 3,353,652 | 11/1967 | Fellner, Jr. | 198/592 X |
| 3,746,144 | 7/1973 | Englert | 198/592 |
| 3,779,367 | 12/1973 | Hope et al. | 198/592 |
| 3,885,682 | 5/1975 | McWilliams | 198/589 X |
| 5,172,804 | 12/1992 | Chersin | 198/861.5 |

*Primary Examiner*—James R. Bidwell
*Attorney, Agent, or Firm*—W. Wayne Liauh

[57] ABSTRACT

An improved roller conveyer for conveying objects is disclosed. It comprises: (a) a fixed conveyer section having first parallel frames supported on upright stands and a plurality of first parallel rollers mounted between the first parallel frames of the fixed conveyer section; (b) a power drive for rotating the first parallel rollers of the fixed conveyer section when conveying objects; (c) a liftable conveyer section having second parallel frames and a plurality of second parallel rollers mounted between the second parallel frames of the liftable conveyer section. The liftable conveyer section has: (a) a fixed end pivoted to one end of the fixed conveyer section and a free end; (b) a transmission mechanism mounted on the liftable conveyer section for rotating the second parallel rollers of the liftable conveyer section; (c) a clutch member mounted on the liftable conveyer section couple the transmission mechanism with the power drive; and (d) a plurality of gas spring levers and springs respectively mounted on the liftable conveyer section to provide resistance to the liftable conveyer section when it is down-lifted. The transmission mechanism is coupled to the power drive by the clutch member when the liftable conveyer section is not lifted, and the transmission mechanism is disconnected from the power drive when the liftable conveyer section is lifted from the fixed conveyer section.

9 Claims, 7 Drawing Sheets

LIFTABLE ROLLER CONVEYER

BACKGROUND OF THE INVENTION

The present invention relates to roller conveyers, and relates more particularly to a liftable roller conveyer which has a liftable conveyer section that can be smoothly lifted from the fixed conveyer section, or set into engagement with the power drive of the fixed conveyer section for carrying things from the fixed conveyer section.

Roller conveyers have been extensively used in factories for conveying materials, products, etc. However, the installation of a roller conveyer will block up space to stop persons, trucks, etc. from passing through. In order to eliminate this drawback, roller conveyers with liftable conveyer sections have been developed. The liftable conveyer sections of regular roller conveyers are commonly operated by hand. There are roller conveyers equipped with a respective power drive controlled to lift the respective liftable conveyer section. However, the installation of such a power drive greatly complicates the structure of the roller conveyers and increases their manufacturing cost. When a liftable conveyer section is designed to be operated by hand, compression springs are commonly installed to facilitate the movement of the liftable conveyer section. However, during the return stroke of the liftable conveyer section, the operator must carefully lower the liftable conveyer section, or the liftable conveyer section will fall, causing a loud noise or damaging the mechanism of the conveyer. Furthermore, because the liftable conveyer section can be lifted from the fixed conveyer section, it is difficult to transmit the driving power of the power drive from the fixed conveyer section to the rollers of the liftable conveyer section. Therefore, an auxiliary power drive is needed to drive the rollers of the liftable conveyer section.

SUMMARY OF THE INVENTION

The present invention has been accomplished under the circumstances in view. It is one object of the present invention to provide a liftable roller conveyer which has a clutch means to transmit the output power of the power drive from the fixed conveyer section to the liftable conveyer section to simultaneously rotate the rollers on the fixed conveyer section and the liftable conveyer section. It is another object of the present invention to provide a liftable roller conveyer which utilizes gas spring levers and springs to give resistance to the liftable conveyer sections in reversed directions so as to buffer the lifting or return stroke of the liftable conveyer section.

BRIEF DESCRIPTION OF THE DRAWINGS

The present invention will now be described by way of example with reference to the annexed drawings, in which:

FIG. 2b is an enlarged view of Part "b" of FIG. 2a;

Figure 5:
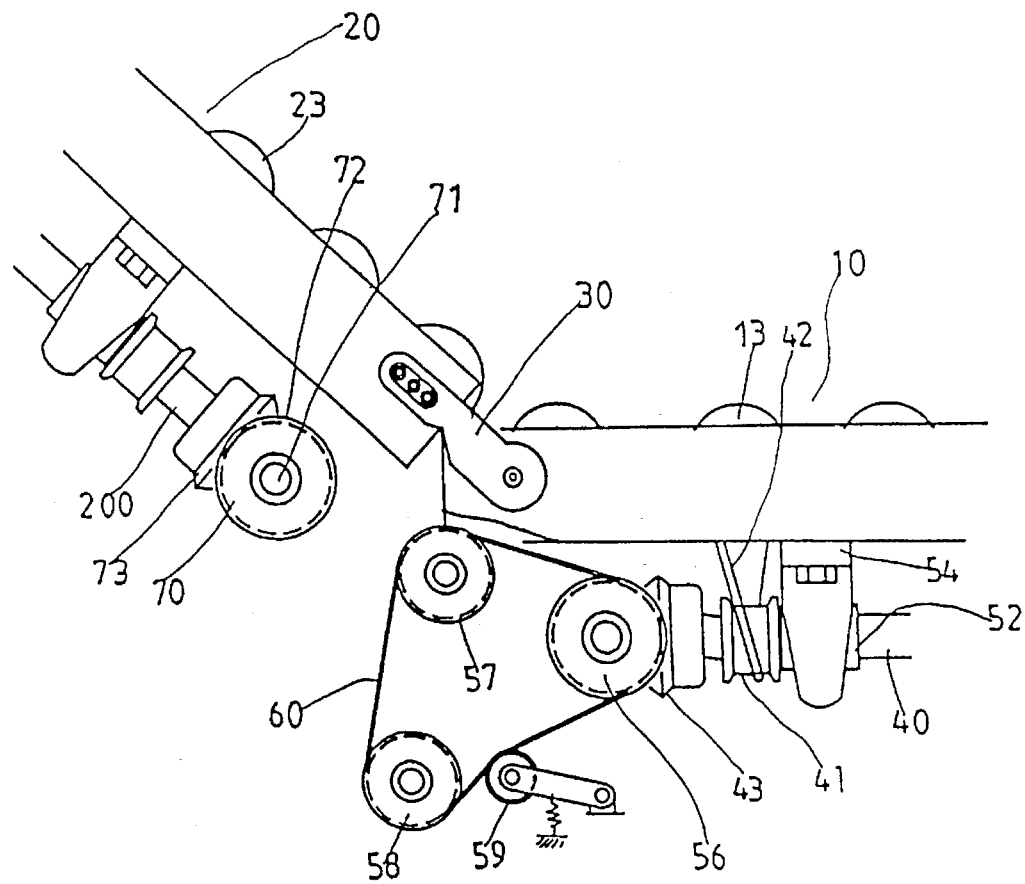
Figure 4:
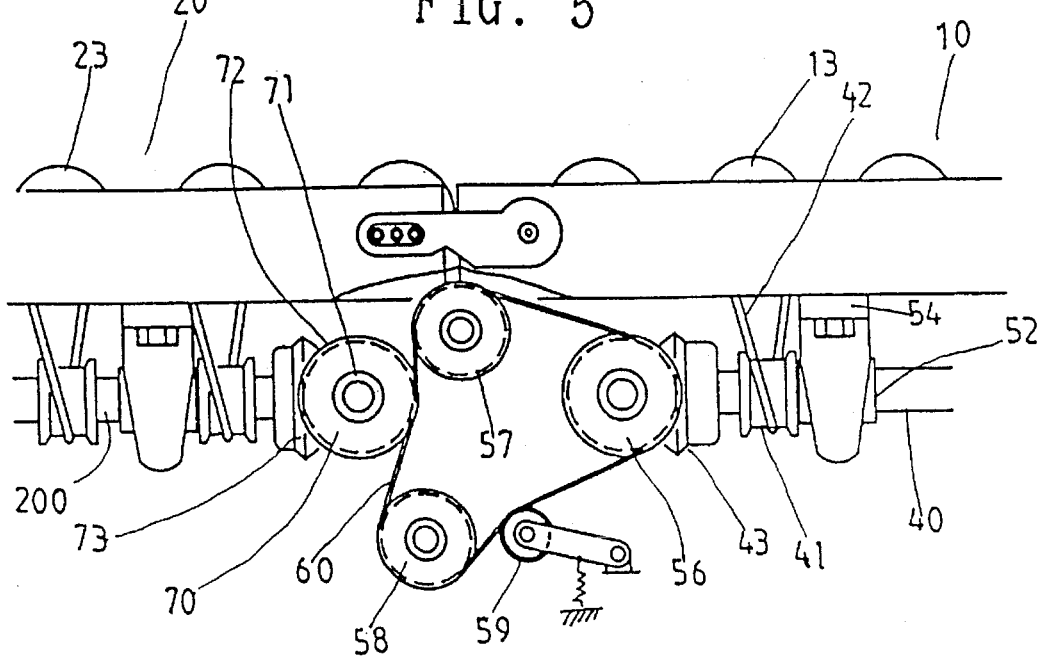
Figure 7:
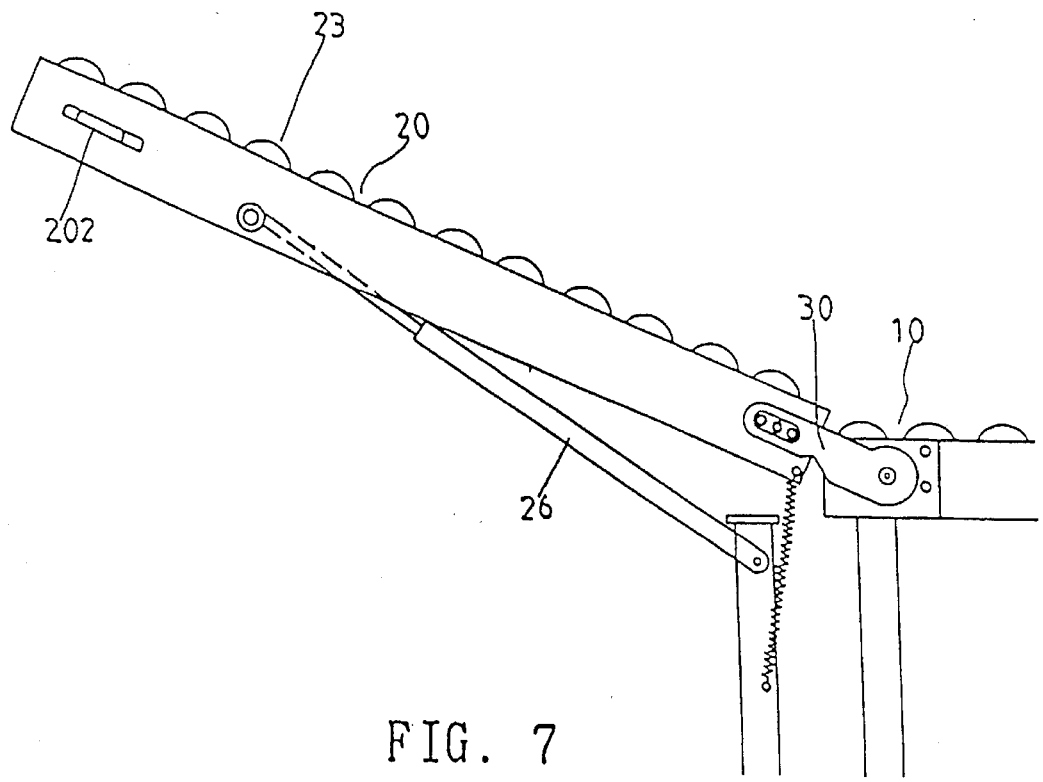
Figure 6:
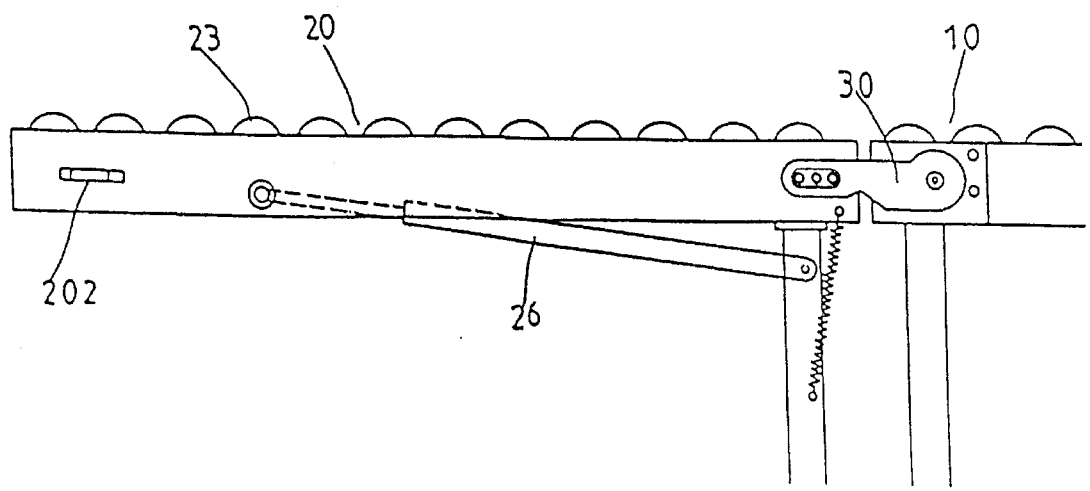
Figure 8:
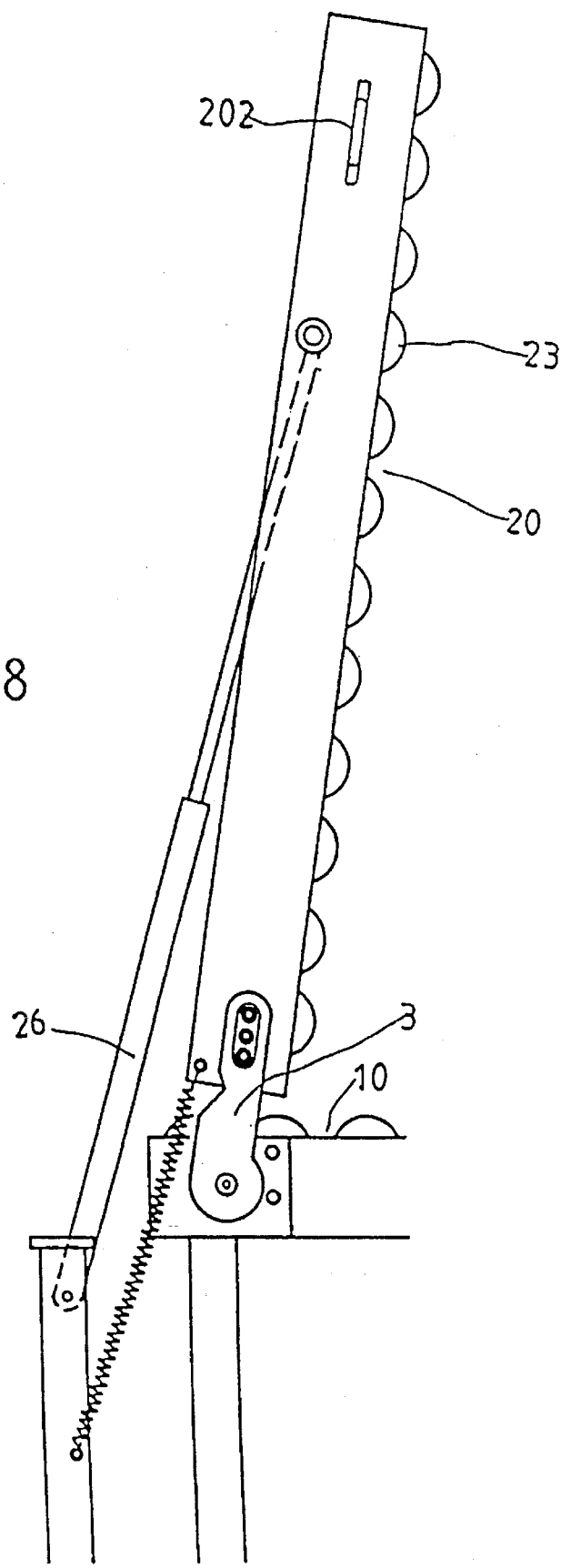

Fig, 4 is a side view showing the engagement of the timing belt wheel at one end of the transmission shaft on the liftable conveyer section and the double-sided endless belt at one end of the main shaft on the fixed conveyer section;

FIG. 5 is similar to FIG. 4 but showing the liftable conveyer section lifted, and the timing belt wheel of the liftable conveyer section disengaged from the double-sided endless belt of the fixed conveyer section;

FIG. 6 shows the positions of the gas spring lever and the springs when the liftable conveyer section is set in alignment with the fixed conveyer section;

FIG. 7 shows the liftable conveyer section lifted, the gas spring levers extended, and the springs stretched; and FIG. 8 shows the liftable conveyer section lifted to the upper limit position.

DETAILED DESCRIPTION OF THE PREFERRED EMBODIMENT

Figure 1:
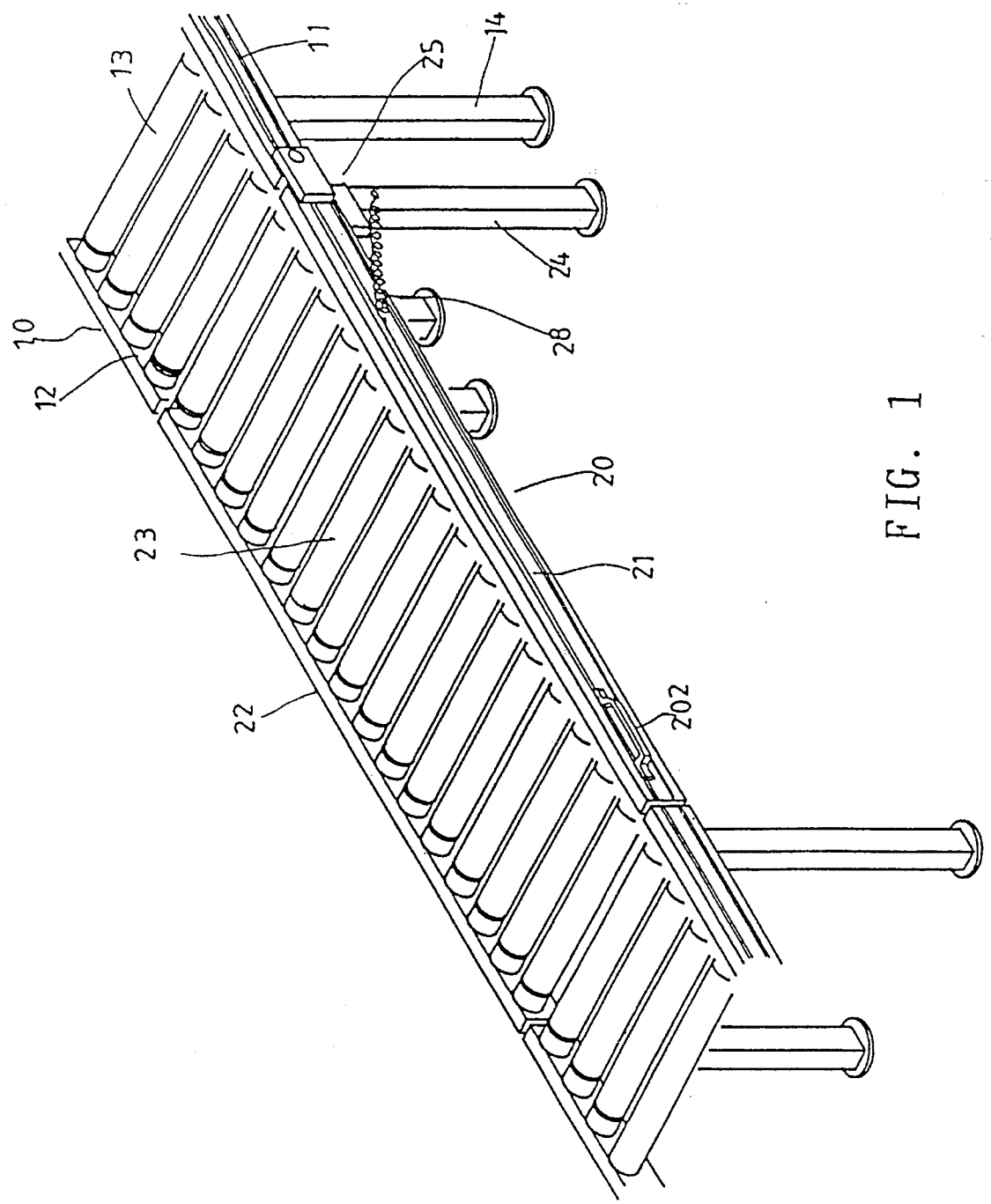
FIG. 1 is an elevational view of a liftable roller conveyer according to the present invention.
Figure 2A:
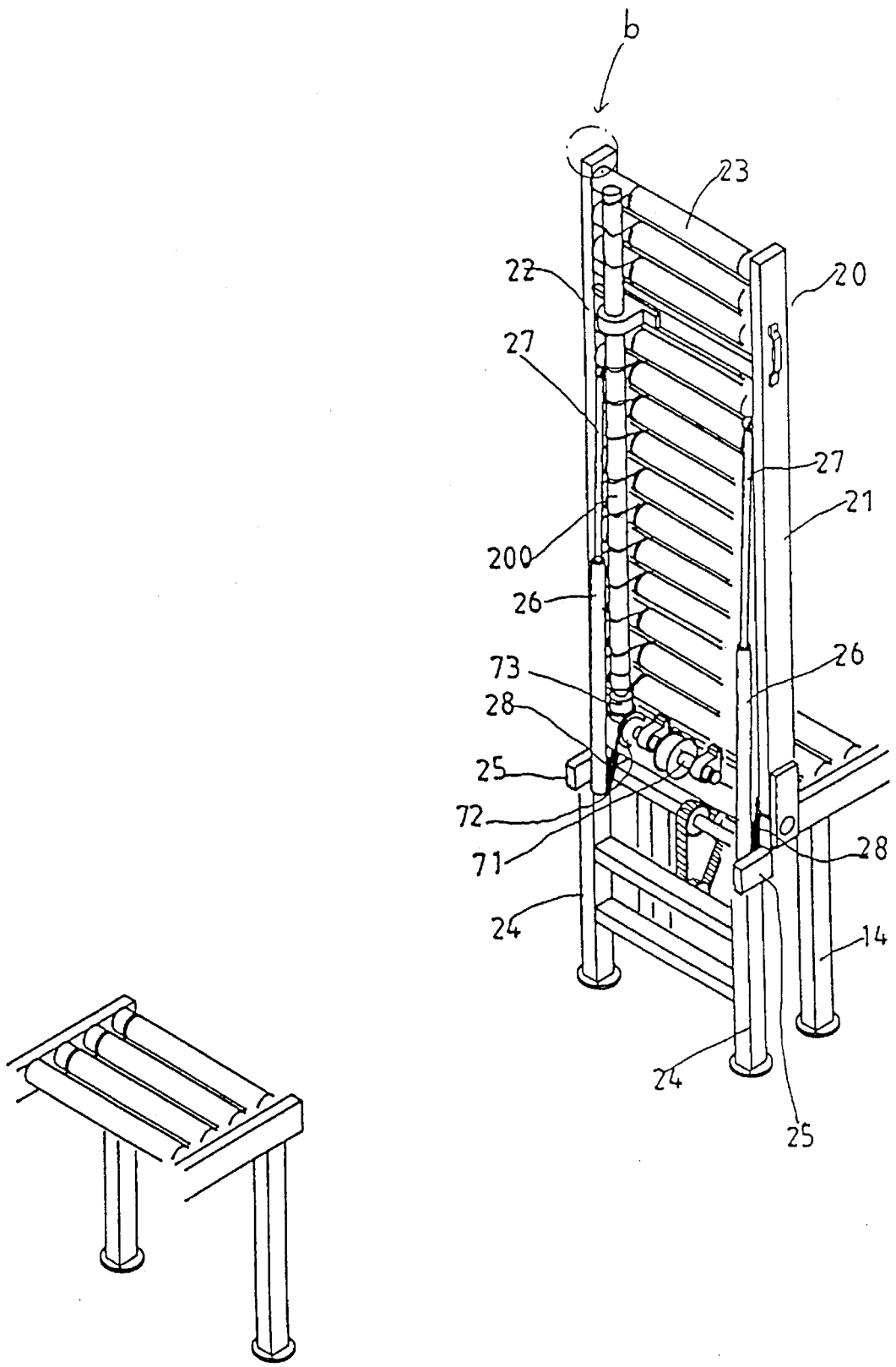
FIG. 2a shows the liftable conveyer section of the roller conveyer of FIG. 1 lifted.
Figure 2B:
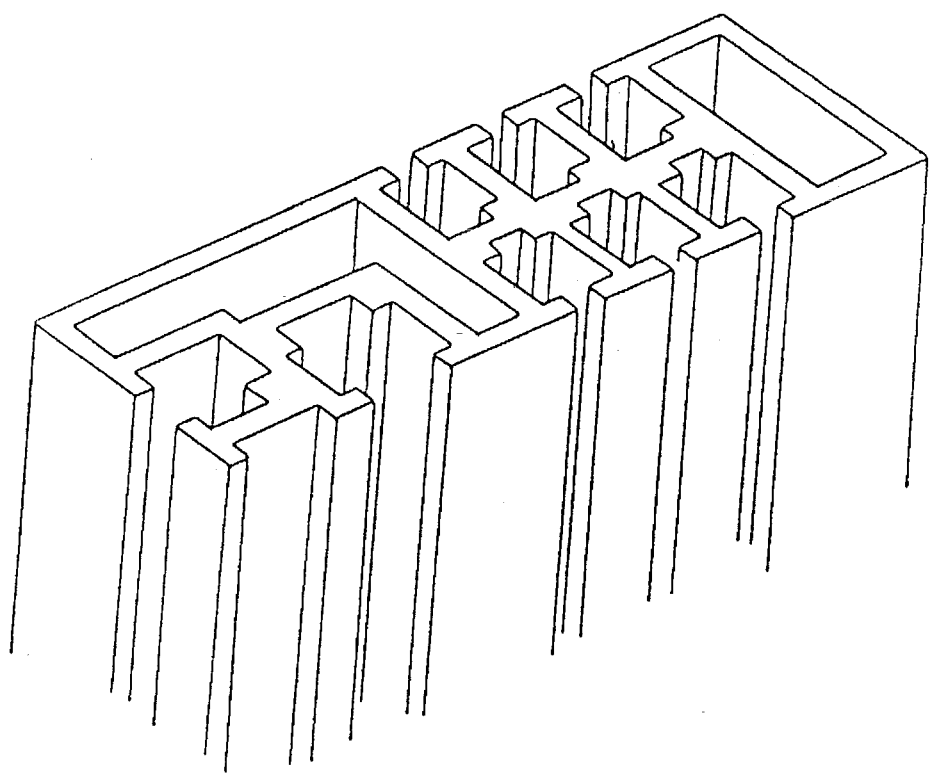

Referring to FIGS. 1 and 2, a liftable roller conveyer, in accordance with the present invention, is generally comprised of a fixed conveyer section 10 and a liftable conveyer section 20 liftably connected to the fixed conveyer section 10. The liftable conveyer section 20 has one end pivoted to the fixed conveyer section 10 by coupling plates 30, which are pivotably connected between the fixed conveyer section 10 and the liftable conveyer section 20 (see also FIG. 5). The opposite end of the liftable conveyer section 20 is a free end. The fixed conveyer section 10 and the liftable conveyer section 20 are comprised of two parallel frames 11 and 12, and 21 and 22, respectively, made of aluminum extrusions, and a plurality of parallel rollers 13, 23, transversely mounted between the parallel frames 11 and 12, and 21 and 22. The parallel frames 11 and 12 of the fixed conveyer section 10 are supported on upright stands 14. An auxiliary stand 24 is connected to the liftable conveyer section 20 adjacent to the coupling plates 30, having two bearing plates 25 bilaterally disposed at the top for supporting the frames 21 and 22 respectively. A set of gas spring levers (i.e., gas-pressured spring levers) 26 are bilaterally fixed to the auxiliary stand 24, having a respective piston rod 27 respectively connected to the frames 21 and 22 of the liftable conveyer section 20 at the inner side. A set of springs 28 are bilaterally connected between the frames 21 and 22 of the liftable conveyer section 20 and the auxiliary stand 24.

Figure 3:
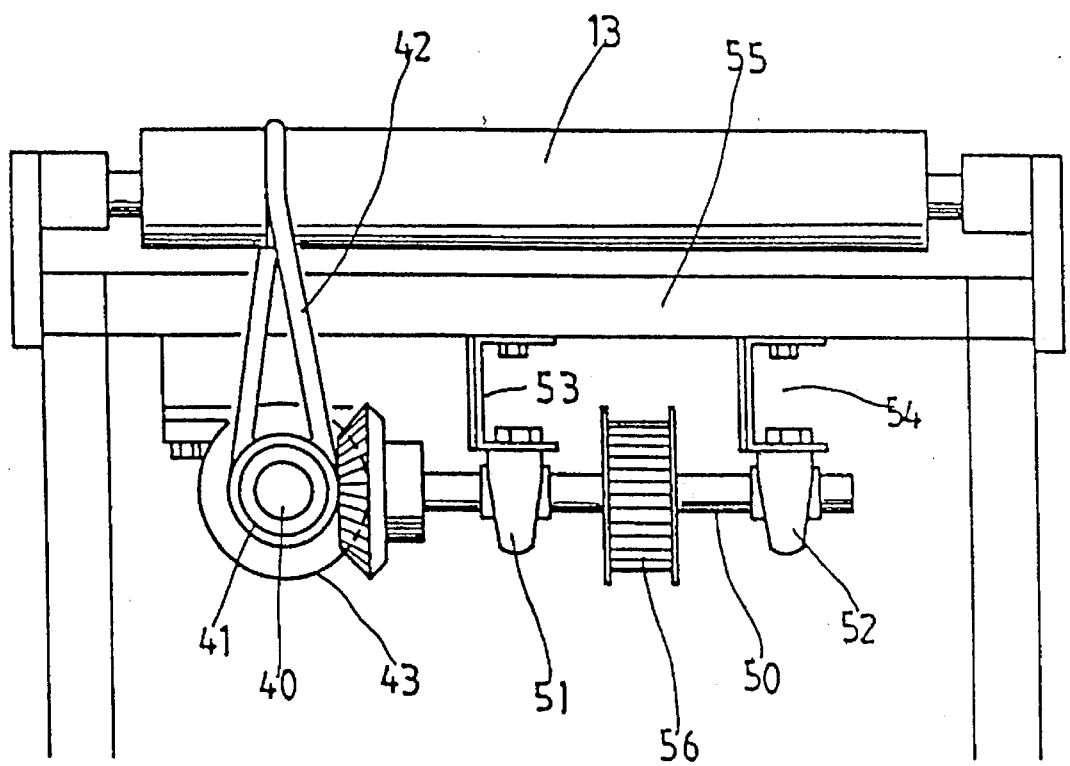
FIG. 3 is an end view of the fixed conveyer section showing the installation of the main shaft, the transmission shaft, and the timing belt wheel according to the present invention.

Referring to FIG. 3, the rollers 13 of the roller conveyer 10 are rotated to convey things by a main lineshaft 40 through a pulley 41 and a round O-ring 42. An aluminum extrusion beam 55 is mounted between the frames 11 and 12 of the fixed conveyer section 10 to hold two brackets 53 and 54. Two axle bearings 51 and 52 are respectively mounted on the brackets 53 and 54 to hold a transmission shaft 50. The transmission shaft 50 is coupled to the main lineshaft 40 through a bevel gearing 43. A belt wheel 56 is fixedly mounted around the transmission shaft 50.

Referring to FIG. 4 and FIG. 3 again, two timing belt wheels 57 and 58 are mounted on the fixed conveyer section 10 to match with the timing belt wheel 56. These three timing belt wheels 56, 57, and 58 are disposed in the three angles of a triangle. A double-sided timing belt 60 is mounted around the timing belt wheels 56, 57, and 58. A spring-supported idler 59 is mounted on the fixed conveyer section 10 and stopped at the double-sided timing belt 60 to maintain its tension at the desired level, and to eliminate damage to the double-sided timing belt 60 when the toothed surface of the double-sided timing belt 60 is not accurately aligned.

Referring to FIG. 5 and FIGS. 1 and 4 again, a timing belt wheel 70 is mounted on the liftable conveyer section 20 and moved to act with the double-sided timing belt 60. The timing belt wheel 70 is mounted on a revolving shaft 71. A bevel gear 72 is fixedly mounted around the revolving shaft 71. A power transmission shaft 200 is mounted on the liftable conveyer section 20 and turned to rotate the rollers 23. A bevel gear 73 is fixedly mounted around the power transmission shaft 200 and meshed with the bevel gear 72. Therefore, when the timing belt wheel 70 is forced into engagement with the double-sided endless timing belt 60, the timing belt wheel 70 is rotated by the double-sided timing belt 60, thereby rendering the transmission shaft 200 to rotate the rollers 23 (see FIG. 4). When the liftable conveyer section 20 is lifted to disengage the timing belt wheel 70 from the double-sided timing belt 60, the power transmission shaft 200 does no work, and therefore the rollers 23 are stopped.

When the liftable conveyer section 20 is turned to the horizontal working position in alignment with the fixed conveyer section 10, the springs 28 are not stretched, the weight of the liftable conveyer section 10 and the push force of the gas spring levers 26 are balanced, and therefore the liftable conveyer section 10 can be conveniently lifted by hands through the handles 202 at the free end of the liftable conveyer section 20. During the lifting stroke as shown in FIG. 7, the torque relatives produced by the weight of the liftable conveyer section 20 becomes gradually smaller than the torque produced by the push force of the gas spring levers 26. However, the pull force of the springs 28 prevents the liftable conveyer section 20 from being lifted in a rush (i.e., the springs 28 give a damping force to the lifting stroke). After the liftable conveyer section 20 has been lifted to the upper limit position as shown in FIG. 8, it can be lowered to its former working position. When the liftable conveyer section 20 is lowered, the gas spring levers 26 give a damping force to buffer the down stroke of the liftable conveyer section 20 smoothly. Because the frames 11 and 12 and the auxiliary stand 24 are made of aluminum extrusions, the gas spring levers 26 can be conveniently installed and fixed at the desired locations by screws.

While only one embodiment of the present invention has been shown and described, it will be understood that various modifications and changes could be made without departing from the spirit and scope of the invention disclosed.

We claim:

1. A roller conveyer for conveying objects comprising:
   a fixed conveyer section having first parallel frames supported on upright stands and a plurality of first parallel rollers mounted between said first parallel frames of said fixed conveyer section;
   a power drive for rotating said first parallel rollers of said fixed conveyer section when conveying objects;
   a liftable conveyer section having second parallel frames and a plurality of second parallel rollers mounted between said second parallel frames of said liftable conveyer section;
   said liftable conveyer section having a fixed end pivoted to one end of said fixed conveyer section, a free end, a transmission mechanism mounted on said liftable conveyer section for rotating said second parallel rollers of said liftable conveyer section, a clutch means mounted on said liftable conveyer section to couple said transmission mechanism with said power drive, and a plurality of gas spring levers and springs respectively mounted on said liftable conveyer section to provide resistance to said liftable conveyer section when said liftable conveyer section is down-lifted;
   wherein said transmission mechanism is coupled to said power drive by said clutch means when said liftable conveyer section is not lifted, and said transmission mechanism is disconnected from said power drive when said liftable conveyer section is lifted from said fixed conveyer section.

2. The roller conveyer of claim 1 which further comprises an auxiliary stand for supporting said liftable conveyer section in an operative position in alignment with said fixed conveyer section, said auxiliary stand holding said gas spring levers and said springs at one end, said gas spring levers and said springs having their respective opposite ends connected to said liftable conveyer section.

3. The roller conveyer of claim 1 wherein said clutch means comprises three first timing belt wheels mounted on said fixed conveyer section in the three angles of a triangle, said first timing belt wheels rotated by said power drive, a double-sided timing belt mounted around said first timing belt wheels, and a second timing belt wheel mounted on said liftable conveyer section which is coupled to said transmission mechanism and moved to act with said double-sided timing belt.

4. The roller conveyer of claim 3 wherein one of the first timing belt wheels is fixedly mounted around a transmission shaft transversely mounted on said fixed conveyer section and coupled to said power drive through a bevel gearing, said power drive comprising a main lineshaft turned to rotate the rollers of said fixed conveyer section through a transmission belt.

5. The roller conveyer of claim 3 wherein said transmission mechanism comprises a transmission shalt mounted on said liftable conveyer section which is coupled to said second timing belt wheel through a bevel gearing, and turned by said double-sided timing belt through said second timing belt wheel to rotate the rollers of said liftable conveyer section.

6. The roller conveyer of claim 3 wherein a spring-supported idler is mounted on said fixed conveyer section and pressed against said double-sided timing belt.

7. The roller conveyer of claim 1 wherein said gas spring levers exert a push force to said liftable conveyer section, and said springs exert a pull force to said liftable conveyer section, the push force of said gas spring levers being greater than the pull force of said springs and approximately equal to the weight of said liftable conveyer section when said liftable conveyer section is set in the operative position in alignment with said fixed conveyer section.

8. The roller conveyer of claim 1 wherein said liftable conveyer section has handle means at said free end thereof.

9. The roller conveyer of claim 2 wherein said first parallel flames and said upright stands of said fixed conveyer section, said second parallel frames of said liftable conveyer section, and said auxiliary stand are respectively made of aluminum extrusions.

* * * * *